B. C. MANBY.
SHOCK ABSORBER.
APPLICATION FILED JUNE 27, 1914.
1,142,261. Patented June 8, 1915.
FIG.1. FIG.2.
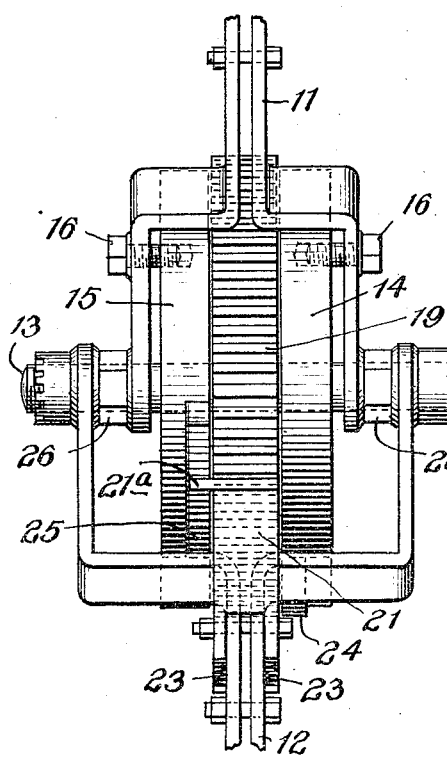
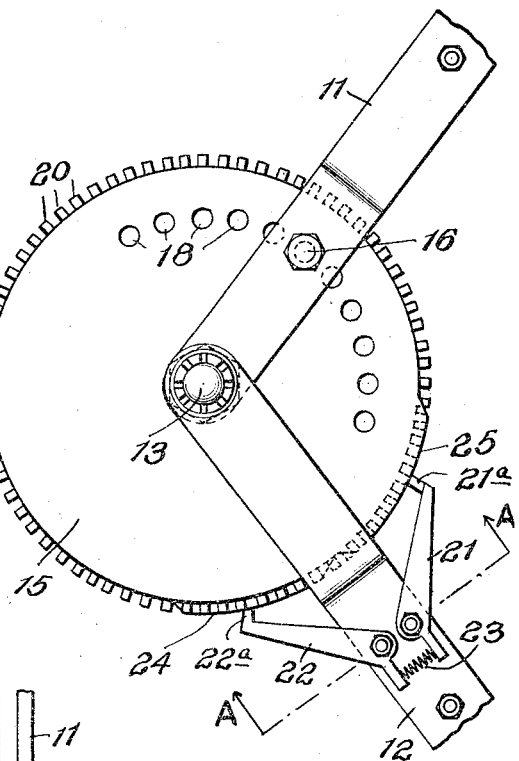
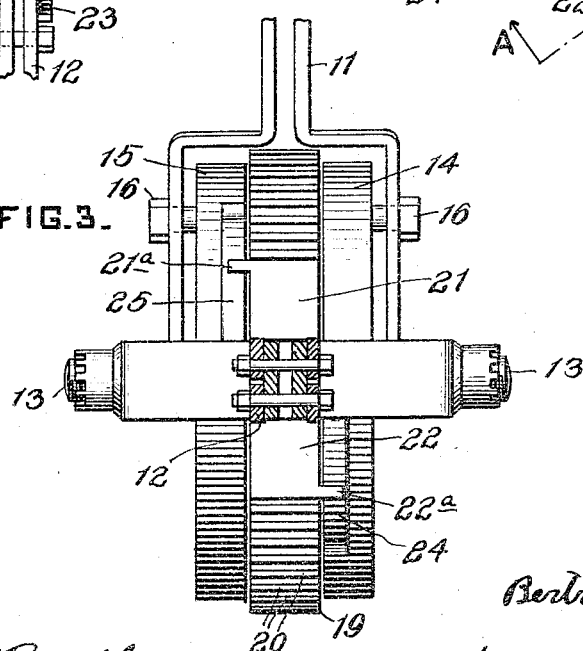
FIG.3.
Bertram C. Manby,
INVENTOR,
WITNESSES:
J. Herbal Bradley
Jo. Baily Brown
by F.W.H. Clay,
ATTORNEY.

UNITED STATES PATENT OFFICE.

BERTRAM C. MANBY, OF CARNEGIE, PENNSYLVANIA.

SHOCK-ABSORBER.

1,142,261.

Specification of Letters Patent.

Patented June 8, 1915.

Application filed June 27, 1914. Serial No. 847,713.

*To all whom it may concern:*

Be it known that I, BERTRAM C. MANBY, a citizen of the United States, residing at Carnegie, in the State of Pennsylvania, have invented a certain new and useful Shock-Absorber, of which the following is a specification.

My invention relates to that class of devices intended to prevent too great a strain on the supporting springs of vehicles. And my particular object is to provide a shock absorber which will under normal conditions of load and spring vibration not affect the operation of the spring, but which will, in case of a sudden compression of the springs beyond the ordinary limit, operate to check the downward movement of the vehicle body.

My device also engages when the vehicle rebounds from a sudden shock and prevents the tendency of the body to bounce to the limits of expansion of the springs.

I have provided a device which has a neutral zone, comprising all of the ordinary little bumps resulting from changes of road surface, allowing the springs to perform all the work of shock absorption under ordinary conditions, and so securing the most comfortable carriage of the vehicle body under normal conditions. When a severe shock occurs, the springs are compressed to the limit of this neutral zone, upon which my device engages and aids the springs in the prevention of further compression. Then when the rebound occurs the load passes upward through the neutral zone to the point where my device again engages to stop this rebound before it reaches the point of danger to the springs and of discomfort to the passengers. Thus I secure a shock absorber which does not stiffen the vehicle springs under normal conditions and which is active in both directions to prevent excessive shocks.

Referring to the drawings, Figure 1 is a perspective of the essential parts of my device; Fig. 2 is a side view of the same portion; and Fig. 3 is a partial section and perspective from the line A, A, in Fig. 2.

My device consists of two arms, one of which, 11, is attached to the top of an elliptical spring, or to the vehicle body, and the other, 12, is attached to the lower part of the spring, or to the running gear of the vehicle. These arms are connected by the axle 13. Mounted on this same axle are plates 14 and 15 which are attached to the forks of arm 11 by means of screws 16. Holes 18 are provided in these plates for adjustment, as illustrated and later described. Between the plates and loosely mounted on the axle is a wheel 19 having on its periphery teeth 20. On the arm 12 are mounted pawls 21, 22. A coil spring 23 is provided to press their ends into engagement with the teeth of wheel 19. On the plates 14 and 15 are provided cams 24 and 25, respectively. The pawl 21 has on its left side a projection 21ª to engage the cam 25, and the pawl 22 has on its right side a corresponding projection 22ª. Nuts 26 are provided at the ends of the axle for the purpose of tightening the contact between plates 14 and 15 and the wheel 19. By putting the screws 16 in any one of the holes 18 desired the relative position of the cams 24 and 25 on the periphery of the device can be adjusted.

The operation of my shock absorber is as follows: The arms 11 and 12 are attached respectively to the vehicle body and the running gear, or to the top and bottom of the vehicle springs. The plates 14 and 15 are fixed on the forks of the arm 11; the wheel 19 is free to rotate between said plates in either direction, retarded only by the friction of the bearing surfaces of the plates and wheel upon each other. When the vehicle body rises or falls, it is evident that the two arms pivoted on axle 13 will tend to fold together or to straighten out. In the normal position of the cams 24 and 25, which is shown in Fig. 2, the pawls 21 and 22 are held out of engagement with teeth 20 of the wheel 19 by the cams. Therefore under ordinary conditions of slight variation in the distance between the vehicle body and the running gear, the pawls will simply ride backward and forward on the tops of the cams. But if the distance is lessened so that the end of pawl 21 rises to the end of cam 25 the pawl would immediately engage the teeth on wheel 19, and if the distance is further decreased, the wheel must be rotated counter-clockwise between the friction plates. If on the other hand the distance is increased to the point where the end of pawl 22 reaches the end of cam 24, the pawl will engage the wheel and any further straightening of the arms must rotate the wheel clockwise between the friction plates. In all intermediate positions however, the device is not affected by variation of said distance. By the adjustable cams, the same shock absorber may be varied to suit different vehicles and to suit different loads in the same vehicle, or to suit the varying tastes of the drivers.

A packing may be provided between the plates and the wheel 19 if desired, but is not necessary.

The many advantages of my device will be apparent to those familiar with this art.

It will be understood that in addition to adjustment of the neutral zone by moving the cams around the periphery by means of the screws 16 and holes 18, the cams may be made of greater or less length, as may be desired, to suit varying conditions of vehicles and service. This furnishes an additional means of adjustment.

Having thus described and illustrated my invention, I claim:

1. In a shock absorber comprising a rotatable wheel frictionally mounted between fixed plates the combination of pawls adapted to engage the wheel whereby to rotate it against friction, and cams on the plates adapted to prevent engagement of the pawls and wheel except at predetermined limits of rise and fall of the vehicle body.

2. A shock absorber for spring mounted vehicles consisting of an arm attached to the vehicle body, an arm attached to the running gear frame, a common axle, plates mounted on the axle and attached to one arm, a toothed wheel rotatably mounted between said plates, spring operated pawls on the other arm adapted to engage the wheel in either direction of rotation of their bearing arm, cams on the plates adapted to prevent engagement of the pawls and wheel except at predetermined points of maximum and minimum rise of the vehicle body, means for adjusting the relative position of the cams, and means for adjusting the friction of the wheel and plates.

In testimony whereof I have hereunto signed my name in the presence of the two subscribed witnesses.

BERTRAM C. MANBY.

Witnesses:
Jo. BAILY BROWN,
FRED'K STAUB.